United States Patent
Djonga et al.

(10) Patent No.: US 10,381,971 B2
(45) Date of Patent: Aug. 13, 2019

(54) METHOD AND APPARATUS FOR ESTIMATING A TEMPERATURE CONTRIBUTION OF AN INVERTER FOR AN ELECTRICAL MACHINE

(71) Applicant: Robert Bosch GmbH, Stuttgart (DE)

(72) Inventors: Christian Djonga, Heilbronn (DE); Michele Hirsch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 15/562,058

(22) PCT Filed: Feb. 10, 2016

(86) PCT No.: PCT/EP2016/052758
§ 371 (c)(1),
(2) Date: Sep. 27, 2017

(87) PCT Pub. No.: WO2016/155927
PCT Pub. Date: Oct. 6, 2016

(65) Prior Publication Data
US 2018/0069501 A1 Mar. 8, 2018

(30) Foreign Application Priority Data
Apr. 1, 2015 (DE) .................. 10 2015 205 958

(51) Int. Cl.
*H02P 29/68* (2016.01)
*H02P 29/032* (2016.01)
(Continued)

(52) U.S. Cl.
CPC .............. *H02P 29/68* (2016.02); *B60L 3/003* (2013.01); *B60L 3/0061* (2013.01);
(Continued)

(58) Field of Classification Search
CPC ...... H01L 23/36; H01L 23/473; H02P 27/085; H02P 29/68; H02M 1/14; H02M 1/32
See application file for complete search history.

(56) References Cited

U.S. PATENT DOCUMENTS

| 6,112,164 | A  | * | 8/2000  | Hobson | ................... | G06F 1/206 702/132 |
| 6,487,668 | B2 | * | 11/2002 | Thomas | .................. | G06F 1/206 713/322 |

(Continued)

FOREIGN PATENT DOCUMENTS

| DE | 102012210658 | 12/2013 |
| EP | 2031753      | 3/2009  |
| EP | 2579441      | 4/2013  |

OTHER PUBLICATIONS

International Search Report for Application No. PCT/EP2016/052758 dated Apr. 26, 2016 (English Translation, 3 pages).

*Primary Examiner* — Rina I Duda
(74) *Attorney, Agent, or Firm* — Michael Best & Friedrich LLP

(57) ABSTRACT

The invention relates to a method for estimating a temperature contribution of an inverter used to energize an electrical machine, in particular a synchronous machine. The method comprises the steps for calculating oscillating temperature swings of components of the inverter; and determining, as the estimated temperature contribution ($\Delta T(\omega)$, $\Delta Ti(\omega)$, ($\Delta Td(\omega)$)) of the inverter, an upper envelope of an amplitude of a sum of the calculated oscillating temperature swings. The method according to the invention or an apparatus designed to carry out the method can be expanded for the purpose of estimating a temperature or a complete temperature contribution of the inverter and is provided, in particular, for use in an electric vehicle or a hybrid vehicle having an electrical drive without a variable speed gear in order to (Continued)

estimate the operating temperature of vehicle drive power electronics accommodated therein.

17 Claims, 9 Drawing Sheets

(51) Int. Cl.
    *H02M 7/537*     (2006.01)
    *B60L 3/00*     (2019.01)
    *H02P 27/06*     (2006.01)
    *B60L 15/00*     (2006.01)
    *H02P 27/04*     (2016.01)
    *H02M 1/32*     (2007.01)

(52) U.S. Cl.
    CPC ........... *B60L 15/007* (2013.01); *H02M 7/537* (2013.01); *H02P 27/06* (2013.01); *H02P 29/032* (2016.02); *B60L 2210/40* (2013.01); *B60L 2240/525* (2013.01); *H02M 2001/327* (2013.01); *H02P 27/04* (2013.01); *Y02T 10/644* (2013.01); *Y02T 10/645* (2013.01); *Y02T 10/7241* (2013.01)

(56) References Cited

U.S. PATENT DOCUMENTS

| | | | | |
|---|---|---|---|---|
| 7,071,649 | B2* | 7/2006 | Shafer | B62D 5/0496 |
| | | | | 318/708 |
| 7,652,587 | B2* | 1/2010 | Hohn | F16C 19/525 |
| | | | | 318/139 |
| 2003/0076064 | A1* | 4/2003 | Kleinau | B62D 5/0481 |
| | | | | 318/567 |
| 2009/0072770 | A1 | 3/2009 | Son et al. | |
| 2013/0135906 | A1* | 5/2013 | Kawamura | H01L 23/36 |
| | | | | 363/40 |

\* cited by examiner

METHOD AND APPARATUS FOR ESTIMATING A TEMPERATURE CONTRIBUTION OF AN INVERTER FOR AN ELECTRICAL MACHINE

BACKGROUND OF THE INVENTION

The present invention relates to a method and an apparatus for estimating a temperature contribution of an inverter used for supplying current to an electric machine, in particular a synchronous machine.

In hybrid and electric vehicles, monitoring the temperature of the power electronics plays a significant role. If the IGBTs and diodes installed in the pulse-controlled inverter, hereinafter referred to simply as the inverter, become too hot, damage to the semiconductors of the inverter and an associated failure of the electric drive may result. A temperature module is used for monitoring the temperatures. This temperature model determines the temperatures of the semiconductors and enables a timely limitation of the torque and the resulting currents.

In hybrid/electric vehicles, in which the electric drive is coupled to the wheels or to the output without a speed converter, the electric drive must therefore apply the required torque for starting or at low rotational frequencies without mechanical support. This is particularly relevant when starting on hills or steep slopes.

As a result, the inverter which is to provide this high current demand is overloaded, since, at low rotational frequencies, particularly at a rotational speed of zero, the current is applied in the worst case via the same power semiconductor of one phase for a longer period. An asymmetrical loading of the power semiconductors of the inverter occurs. Accordingly, this results in the necessary of identifying this overloading of the power semiconductors and thus reducing the current for the self-protection of the power semiconductors.

One known approach for estimating or calculating the power semiconductor temperatures is based on a linear network method. The power loss (a total of twelve partial losses) of each power semiconductor is calculated from the instantaneous currents, voltages, and the duty cycle, and a respective temperature swing is calculated from said power loss. For this purpose, the thermal dependency between the individual power semiconductors, which are embodied by IGBTs and diodes, is used. This thermal dependency is described by first-order transfer functions. For calculating the absolute maximum IGBT temperature, the maximum from the six individual IGBT temperature swings is ascertained and added to the cooling water temperature. The absolute maximum diode temperature is calculated analogously. The disadvantage of this method is its lack of feedback and the complexity of its calculation. Due to its lack of feedback, it is not robust with respect to disturbances.

In addition, it is known to use a temperature observer for calculating the mean temperatures of the IGBTs and diodes. However, the temperature observer is not suitable for temperature estimation in the case of highly transient control processes, for example, when starting or at low rotational frequencies.

SUMMARY OF THE INVENTION

The object of the present invention is therefore to provide a method and a device via which the known method may be improved. In addition, the method and the device shall be universally applicable, i.e., also for low rotational frequencies, and shall be able to provide good temperature estimations.

A method for estimating a temperature contribution of an inverter used for supplying an electric machine with current, in particular a synchronous machine, comprises the steps for calculating oscillating temperature swings of components of the inverter; and determining an upper envelope of an amplitude of a sum of the calculated oscillating temperature swings, as an estimated temperature contribution of the inverter.

The electric machine is preferably supplied with three-phase current. The inverter thus has a three-phase design.

One advantageous embodiment of the method provides that the upper envelope is determined as a maximum amplitude of the amplitudes of the summed calculated oscillating temperature swings calculated over one, preferably full, electrical period.

An additional advantageous embodiment of the method provides that the oscillating temperature swings are calculated based on a calculated zero-mean oscillating power loss and preferably based on a mean power loss calculated over a full electrical period.

In addition, one embodiment of the method provides that the oscillating temperature swings are calculated based on a specified, in particular sinusoidal, signal shape of an anti-derivative of harmonics of the zero-mean oscillating power loss, and are furthermore calculated preferably based on a Fourier analysis.

Furthermore, one embodiment of the method provides that the oscillating temperature swings are calculated based on specified transfer functions, preferably for all phases of the inverter, said transfer functions describing thermal couplings between components of the inverter associated with the same phase. The transfer function is specified via a frequency response and a phase response. The thermal couplings describe the self-coupling and cross-couplings of the components, i.e., of the IGBTs and the diodes, of the inverter in one phase of the three phases.

In addition, one embodiment provides that the inverter comprises components of a first switch type configured in particular as IGBTs, and components of a second switch type configured in particular as diodes, and that the oscillating temperature swings for the components of the first switch type and the oscillating temperature swings for the components of the second switch type are calculated according to the same parameterized calculation specification, but with different parameter values for the two switch types.

A further embodiment is a method for estimating a temperature or a full temperature contribution of an inverter used for supplying an electric machine with current, in particular a synchronous machine, including the steps for determining a first temperature contribution of the inverter by means of carrying out a method according to one of the previously determined embodiments; and calculating a mean power loss of the inverter via one, preferably full, electrical period; calculating, preferably via a Luenberger temperature observer, a mean temperature contribution of the inverter based on the calculated mean power loss; and calculating a sum of the first temperature contribution and the mean temperature contribution, as the estimated temperature or the full temperature contribution of the inverter. The combined use of the temperature observer and the previously described method according to one of the preceding embodiments makes it possible to be able to use the temperature observer and its advantages even at low rotational frequencies, in a particularly impressive manner.

Furthermore, one embodiment comprises an apparatus for estimating a temperature contribution of an inverter used for supplying an electric machine with current, in particular a synchronous machine, including a device for calculating oscillating temperature swings of components of the inverter; and a device for determining an upper envelope of an amplitude of a sum of the calculated oscillating temperature swings, as an estimated temperature contribution of the inverter.

A further embodiment comprises an apparatus for estimating a temperature or a full temperature contribution of an inverter used for supplying an electric machine with current, in particular a synchronous machine, including a determination device for determining a first temperature contribution via the embodiment depicted above; a calculation device for calculating a mean power loss of the inverter via one, preferably full, electrical period, and for calculating, preferably via a Luenberger temperature observer, a mean temperature contribution of the inverter based on the calculated mean power loss; and an estimation device for calculating a sum of the first temperature contribution and the mean temperature contribution, as the estimated temperature or the full temperature contribution of the inverter. This apparatus which is provided with a temperature observer provides the advantage that the temperature observer and its advantages may also be utilized even at low rotational frequencies.

Furthermore, one embodiment comprises a use of a previously described method or a corresponding apparatus, wherein the method or the apparatus is used in an electric vehicle or a hybrid vehicle in which in particular an electric drive is coupled to the vehicle wheels or the drive without a speed converter, and is used therein in particular for self-protection purposes of a power electronic system controlling or driving the electric vehicle, for driving scenarios such as low driving speeds, starting from a standstill, and in particular starting on a hill. The previously described embodiments of the method and the apparatus are particularly well suited to this application.

Features of the above embodiments may be combined in any arbitrary manner. Features disclosed according to the method shall also be considered to be disclosed according to the apparatus, and vice-versa.

The present invention provides a possibility of using the temperature observer even at low frequencies, and thus also utilizes its advantages and robustness. In contrast to the aforementioned known method, the maximum from the six IGBT temperature swings and six diode temperature swings is not calculated here; rather, the upper envelope of the IGBT/diode temperature is calculated. (The terminology "IGBT/diode temperature" is used below as a short form for the formulation "IGBT temperature and diode temperature." This applies correspondingly to other terms having this notation.) This upper envelope is to refer to the mean temperature which is calculated by the temperature observer. The upper envelope is thus the difference between the unknown absolute maximum temperature and the mean temperature determined via the temperature observer.

The present invention enables a uniform calculation of the IGBT/diode temperatures in all frequency ranges. The present invention makes it possible to enhance the temperature observer which has been used hitherto, which is used for calculating the mean IGBT/diode temperatures, with an algorithm for estimating the upper envelope of the IGBT/diode temperatures at low frequencies. For this purpose, by means of the Fourier analysis of the known mean values of the IGBT/diode power losses, the zero-mean oscillating component of said power losses is estimated, examined over one electrical period, which results in an asymmetrical loading of the IGBTs or diodes at low frequencies. Based on the aforementioned zero-mean oscillation components of the IGBT/diode power losses, the temperature swings oscillating about the mean value of the IGBT/diode temperatures are calculated, taking into consideration the thermal self-couplings and the thermal cross-couplings of the respective high-side components (IGBTs and diodes on the high side) and low-side components (IGBTs and diodes on the low side) of a full bridge which the inverter forms.

The approach of the present invention is to ascertain the temperature swings oscillating about the mean IGBT/diode temperature.

According to one embodiment, in a first step, the zero-mean oscillating IGBT/diode power loss, made up of the first, second, and third harmonics, is determined or calculated from the known mean value of the IGBT/diode power loss and the electrical rotor frequency. To determine the zero-mean oscillating IGBT/diode power loss, its DC component and the signal shape of the antiderivative should be known. It is assumed that the power loss is made up of a sine and a sine squared, or rather, a squared sine. The DC component constitutes the mean value of the power loss over a full electrical period. In a further step, the frequency-dependent amplitude of the upper envelope of the oscillating temperature swings is estimated, as a function of the ascertained zero-mean oscillating power losses and the known transfer functions, for describing the thermal dependencies between the power semiconductors of one phase. For this purpose, knowledge about the amplitude/phase spectrum of the individual transfer functions is used.

The present invention also enables the combination of a temperature observer, which is used for calculating the mean IGBT/diode temperatures, with the method according to one of the embodiments for calculating the zero-mean oscillation components of the temperatures or temperature contributions at low frequencies. Through the use of a Luenberger observer with its feedback, the advantages of said observer, i.e., an adaptation to aging effects and error compensation in the power loss calculation, are utilized even at low frequencies.

One embodiment is explained in great detail below, in order to facilitate understanding of the present invention.

The method calculates the amplitude of the upper envelope of the IGBT/diode temperatures based on the mean IGBT/diode power loss, the transfer functions between the individual components of the inverter in one phase, and the electrical rotor frequency. Since at low frequencies, it is no longer possible to assume that the mean power loss is equally distributed, examined over all three phases, a measure must be developed in order to take this asymmetrical loading of the phases into account. It will initially be described how the zero-mean oscillating component $P_{Oscn}(\omega \cdot t)$ of the power loss is obtained from the known mean value of said power loss. Knowledge about this variable would enable the estimation of the amplitude of the upper envelope of the temperatures $\Delta T(\omega)$. The individual steps for estimating $\Delta T(\omega)$ are explained below.

The power loss may be described as follows:

$$P_v(t) = \overline{P_V} + P_{Oscn}(\omega \cdot t) = P_{VLin} \cdot \sin(\omega \cdot t) + P_{VSq} \cdot \sin(\omega \cdot t)^2 \, t \in [0, \pi] \quad (1)$$

wherein $$\overline{P_V} = \int_0^{2\cdot\pi} P_V(t) \cdot dt \quad (2)$$

$P_V(t)$ is the total power loss.

$\overline{P_V}$ is the mean value of the power loss or its DC component and is assumed in this method to be known or already ascertained.

$P_{Oscn}(\omega \cdot t)$ is the oscillation component of the power loss.
$P_{VLin}$ is proportional to the instantaneous current.
$P_{VSq}$ is proportional to the square of the instantaneous current.

Since, for calculating the zero-mean oscillating components of the power loss, knowledge about the harmonics contained therein is required, a Fourier analysis of the total power loss is carried out. The above equation (1) shows that the power loss is made up of a sine signal and a sine-squared signal. Accordingly, the derivation of the Fourier analysis is depicted.

Within the scope of the current presentation of the determination of the power losses, the Fourier coefficients of a linear component (sine signal) of the power loss will be initially derived, and subsequently, the Fourier coefficients of a quadratic component (sine-squared signal) of the power loss will be derived.

BRIEF DESCRIPTION OF THE INVENTION

The invention will be explained in greater detail below based on the drawings. The following are shown:

DETAILED DESCRIPTION

Figure 1:
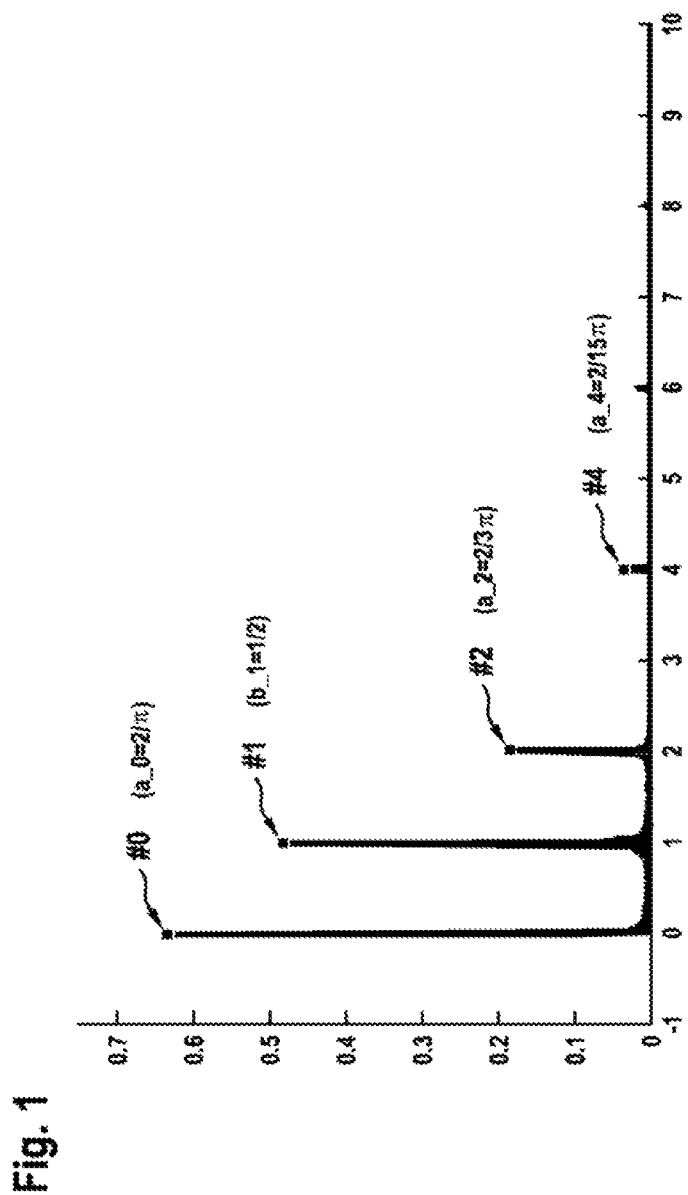
FIG. 1 shows the single-sided amplitude spectrum of the sine examined over a half period.

FIG. 1 shows the single-sided amplitude spectrum of the sine examined over a half period and having a frequency of 1 Hz. The harmonics occurring in the signal and the corresponding normalized amplitudes may be derived from it. It is apparent that the first, second, and fourth harmonics (referred to in FIG. 1 as #1, #2, and #4), as well as a DC component (referred to in FIG. 1 by #0), are present in the signal. Having knowledge of these Fourier coefficients, both the overall curve and the zero-mean oscillating component may be derived:

$$P_{VLin}(t) = \overline{P_{VLin}}\left(1 + \underbrace{\frac{\pi}{2}\cdot\sin(\omega t) - \frac{2\cos(2\omega t)}{3}}_{P_{Oscn}(\omega t)}\right) \rightarrow$$

It therefore follows that:

$$P_{VLin}(t) = \overline{P_{VLin}} + P_{OscnLin}(\omega t) \quad (3)$$

where $$P_{OscnLin} = \overline{P_{VLin}} \cdot \left(\frac{\pi}{2}\cdot\sin(\omega t) - \frac{2\cos(2\omega t)}{3}\right) \quad (4)$$

In this analysis, the fourth harmonic is not considered, since its contribution is irrelevant.

$P_{VLin}(t)$ describes the power loss which is proportional to the instantaneous current.

$P_{OscnLin}(\omega t)$ describes the zero-mean oscillating component of the power loss which is proportional to the instantaneous current.

$\overline{P_{VLin}}$ describes the DC component of the power loss which is proportional to the instantaneous current.

Figure 2:
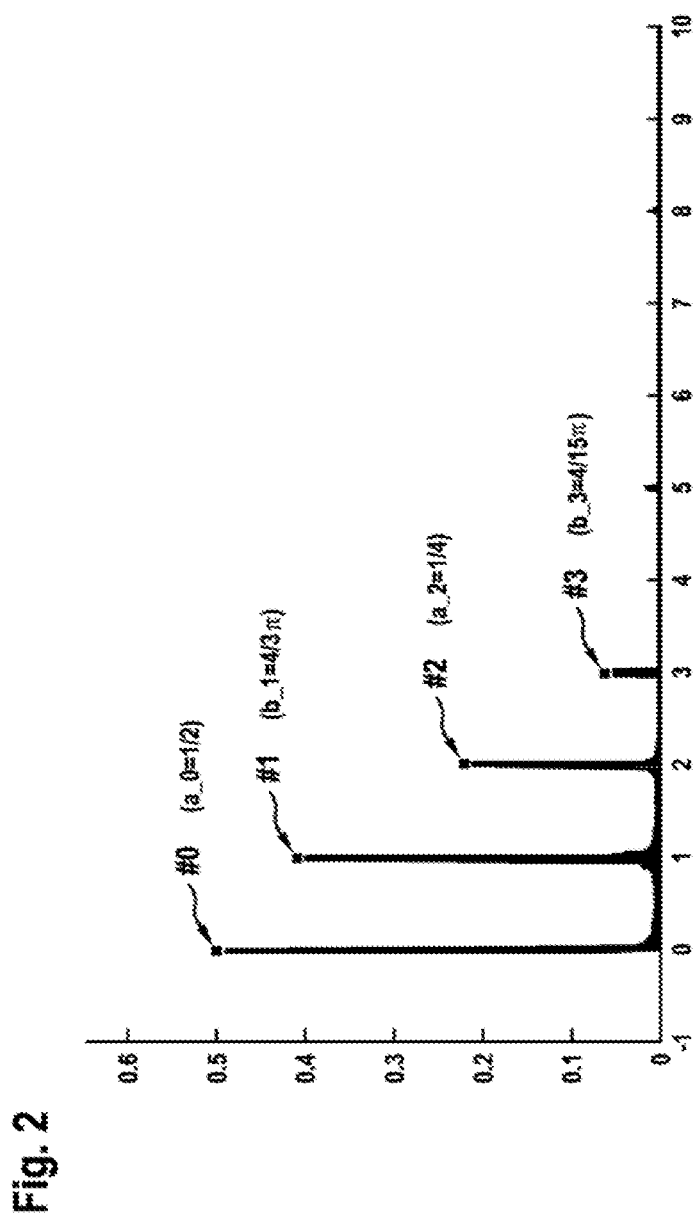
FIG. 2 shows the single-sided amplitude spectrum of sin(wt)^2.

FIG. 2 shows the single-sided amplitude spectrum of sin(wt)^2 (i.e., of the sine-squared signal) over a half-wave. The interesting frequency components may be derived from it. In contrast to the sine signal, a third harmonic (referred to in FIG. 2 as #1, #2, and #3) occurs here, in addition to the DC component (#0 in FIG. 2) and the first and second harmonics. Formula (5) thus results for the quadratic component of the power loss:

$$P_{VSq}(t) = \overline{P_{VSq}}\left(1 + \underbrace{\frac{16\pi}{3}\cdot\sin(\omega t) - \cos(2\omega t) - \frac{16\pi}{15}\cdot\sin(3\omega t)}_{P_{OscnSq}(\omega t)}\right) \quad (5)$$

Analogously to (3) and (4), it follows that:

$$P_{VSq}(t) = \overline{P_{VSq}} + P_{OscnSq}(\omega t) \quad (6)$$

where $$P_{OscnSq}(\omega t) = \overline{P_{VSq}} \cdot \left(\frac{16\pi}{3}\cdot\sin(\omega t) - \cos(2\omega t) - \frac{16\pi}{15}\cdot\sin(3\omega t)\right)$$

The zero-mean oscillating power loss component results by adding equations (4) and (6). Thus, formula (7) may be derived:

$$P_{Oscn}(\omega t) = P_{OscnLin}(\omega t) + P_{OscnSq}(\omega t) \quad (7)$$
$$= P_{f1}\cdot\sin(\omega t) - P_{f2}\cdot\cos(2\omega t) - P_{f3}\cdot\sin(3\omega t)$$

The factors Pf1, Pf2, and Pf3 may be determined from the known Fourier coefficients as follows:

$$P_{f1} = \overline{P_{VLin}}\cdot\frac{\pi}{2} + \overline{P_{VSq}}\cdot\frac{16}{3\pi};$$

$$P_{f2} = \frac{2}{3}\cdot\overline{P_{VLin}} + \overline{P_{VSq}};\ P_{f3} = \overline{P_{VSq}}\cdot\frac{16}{15\pi}$$

$$\overline{P_{VLin}} = U_f\cdot I_m + \frac{\sqrt{2}}{\pi}\cdot I_{P,eff}\cdot f_{PWM}\cdot U_{ZK}\cdot E_{SW,norm}$$

$$\overline{P_{VSq}} = R_f\cdot I_{P,eff}^2$$

The formula for calculating the zero-mean oscillating IGBT power loss is thus:

$$P_{OscnIGBT}(\omega t) = P_{f1IGBT} \cdot \sin(\omega t) - P_{f2IGBT} \cdot \cos(2\omega t) - P_{f3IGBT} \cdot \sin(3\omega t) \quad (8)$$

The formula of the zero-mean oscillating diode power loss results via a temporal shift of (8) by pi:

$$P_{OscnDde}(\omega t) = -P_{f1Dde} \cdot \sin(\omega t) - P_{f2Dde} \cdot \cos(2\omega t) + P_{f3Dde} \cdot \sin(3\omega t) \quad (9)$$

The estimation of the amplitudes of the upper envelope of the IGBT temperatures and diode temperatures will be explained in greater detail below.

To estimate the amplitudes of the upper envelope of the IGBT diode temperatures, the thermal dependencies of the high-side and low-side power semiconductors, i.e., the IGBTs and diodes, in one phase are examined. For this purpose, a total of five first-order transfer functions are used. Said transfer functions describe both the self-coupling and the cross-couplings of the power semiconductors among each other in one phase. The thermal behavior of the self-coupling is described by two first-order filters, for example, a low-pass filter, also referred to as a PT1 filter; and the thermal behavior(s) of the cross-couplings is described by a first-order filter in each case.

Based on the transfer functions and the zero-mean oscillating IGBT/diode power losses according to equations (8) and (9), the upper envelope of the IGBT/diode temperatures is ascertained with the aid of the frequency response of a first-order filter.

Figure 3:
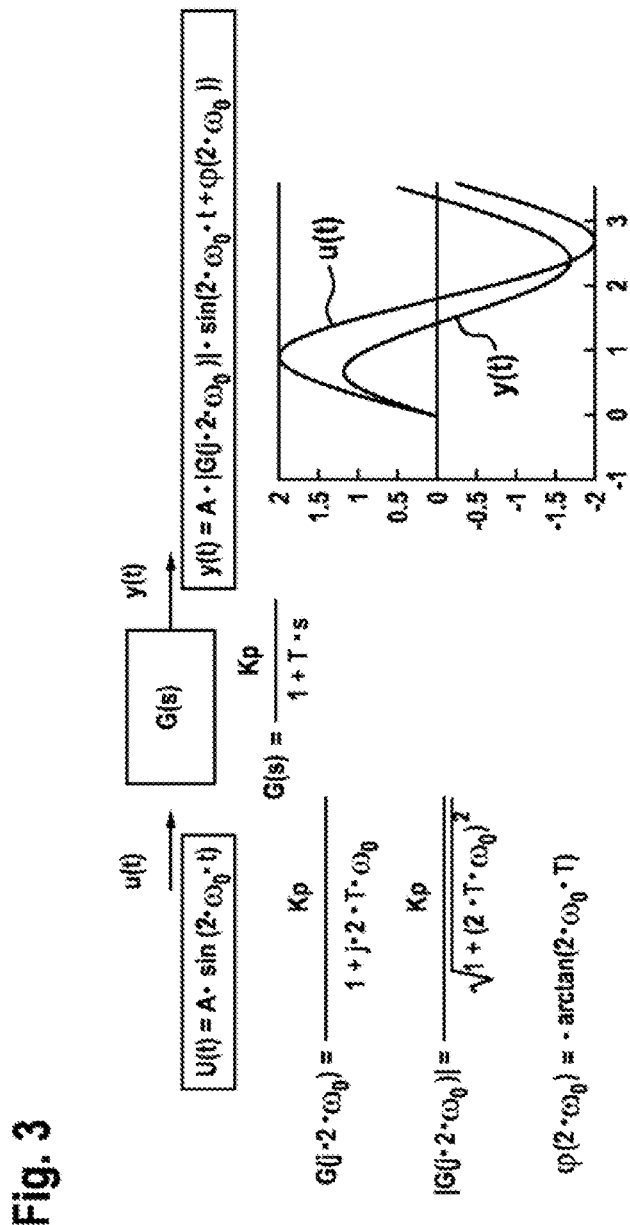
FIG. 3 shows the exemplary interpretation of the frequency response.

The frequency response contains the information about how each frequency is amplified within the system, and about the phase shift which occurs between the input and output signal. FIG. 3 illustrates the interpretation of the frequency response by way of example.

Figure 4:
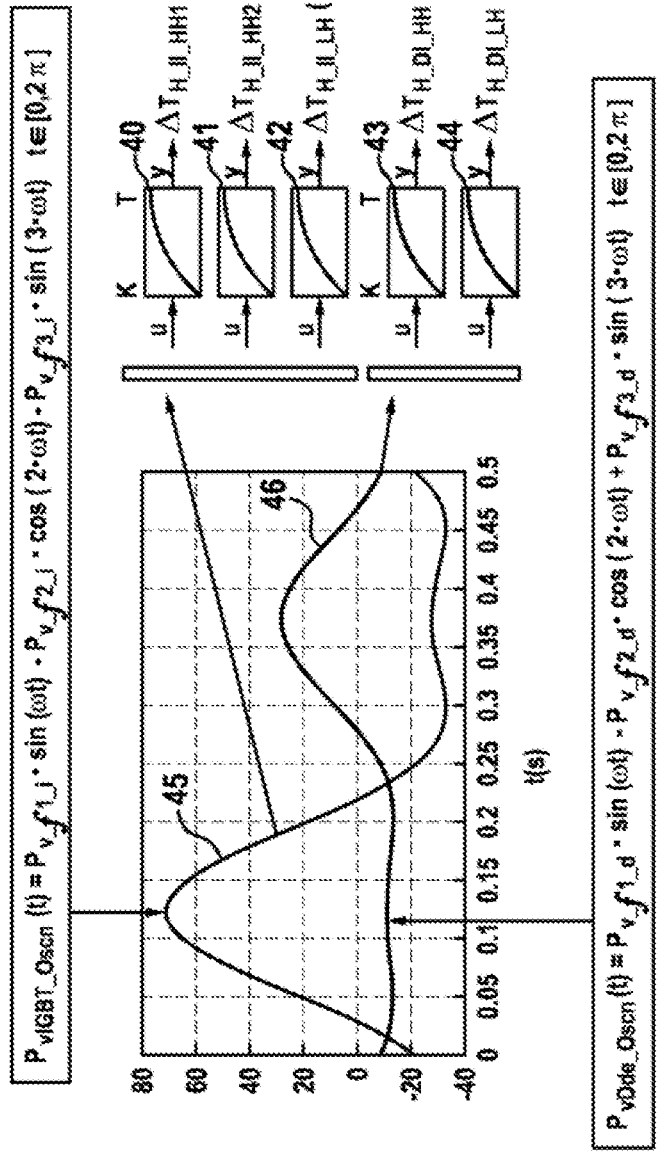
FIG. 4 shows an overview of the calculation of the upper envelope of the IGBT temperature.

To determine the upper envelope of the IGBT/diode temperatures, the zero-mean oscillating IGBT/diode power loss is input at the input of each of the five first-order filters. In FIG. 4, the zero-mean oscillating IGBT power loss is provided with reference numeral 45, and the zero-mean oscillating diode power loss is provided with the reference numeral 46. FIG. 4 also shows, by way of example, an overview of the calculation of the upper envelope of the IGBT temperature. At the output of each first-order filter, provided with reference numerals 40 to 44, a frequency-dependent oscillating temperature swing results which is made up of the first, second, and third harmonics in each case. Thus, a total of five oscillation components result having the same frequency.

Formula (10), which follows directly, describes the temperature swing at the output of each first-order filter:

$$\Delta T_{H\_II\_HH1}(\omega) = A_{ii\_hh1} \cdot \sin(\omega t + \varphi_1) - \\ B_{ii\_hh1} \cdot \cos(2\omega t + \varphi_2) - C_{ii\_hh1} \cdot \sin(3\omega t + \varphi_3)$$

$$\Delta T_{H\_II\_HH2}(\omega) = A_{ii\_hh2} \cdot \sin(\omega t + \varphi_4) - \\ B_{ii\_hh2} \cdot \cos(2\omega t + \varphi_5) - C_{ii\_hh2} \cdot \sin(3\omega t + \varphi_6)$$

$$\vdots$$

$$\Delta T_{H\_DI\_LH}(\omega) = -A_{di\_lh} \cdot \sin(\omega t + \varphi_{13}) - \\ B_{di\_lh} \cdot \cos(2\omega t + \varphi_{14}) + C_{di\_lh} \cdot \sin(3\omega t + \varphi_{15}) \quad (10)$$

The amplitude of the upper envelope of the temperature swings results from the addition of the individual temperature swings at the output of each first-order filter. For purposes of simplification, each of the five components is combined at the same frequency. It therefore follows that:

$$\Delta T_{OscnIGBT}(\omega) = \Delta T_{H\_H\_HH1}(\omega) + \Delta T_{H\_H\_HH2}(\omega) + \\ \Delta T_{H\_H\_LH}(\omega) + \Delta T_{H\_DI\_HH}(\omega) + \Delta T_{H\_DI\_LH}(\omega) \quad (11)$$

After inserting equation (10) into equation (11) and combining the components at the same frequency, equation (12) below may be derived.

$$\Delta T_{OscnIGBT}(\omega) = A_{IGBT} \cdot \sin(\omega t + \varphi_{ges1}) - B_{IGBT} \cdot \cos(2\omega t + \varphi_{ges2}) - C_{IGBT} \cdot \sin(3\omega t + \varphi_{ges3}) \quad (12)$$

$$\Delta T_{IGBT\_max}(\omega) = \max(\Delta T_{OscnIGBT}(\omega)) \text{over}[0;2\pi] \quad (13)$$

$$T_{IGBTMax}(t) = \overline{T}_{IGBT} + \Delta T_{IGBT\_Max}(\omega) t \in [0;2\pi] \quad (14)$$

The maximum of (12) over one electrical period describes the curve of the upper envelope of the IGBT temperature according to equation (13). The maximum absolute IGBT temperature according to equation (14), which may occur at low frequencies, results from the addition of the mean temperature and the upper envelope mentioned above. The determination of the amplitudes $A_{IGBT}$, $B_{IGBT}$, $C_{IGBT}$ and the phases $\varphi_{ges1}$, $\varphi_{ges2}$, $\varphi_{ges3}$ may be derived from the addition theorems, trigonometric formulas, and superposition theorems.

The calculation of the upper envelope of the diode temperature is analogous to the IGBT calculation described in detail above. However, attention must be paid here to the sign differences (see equations (8) and (9)) which have resulted during the determination of the zero-mean oscillating power loss.

Figure 5:
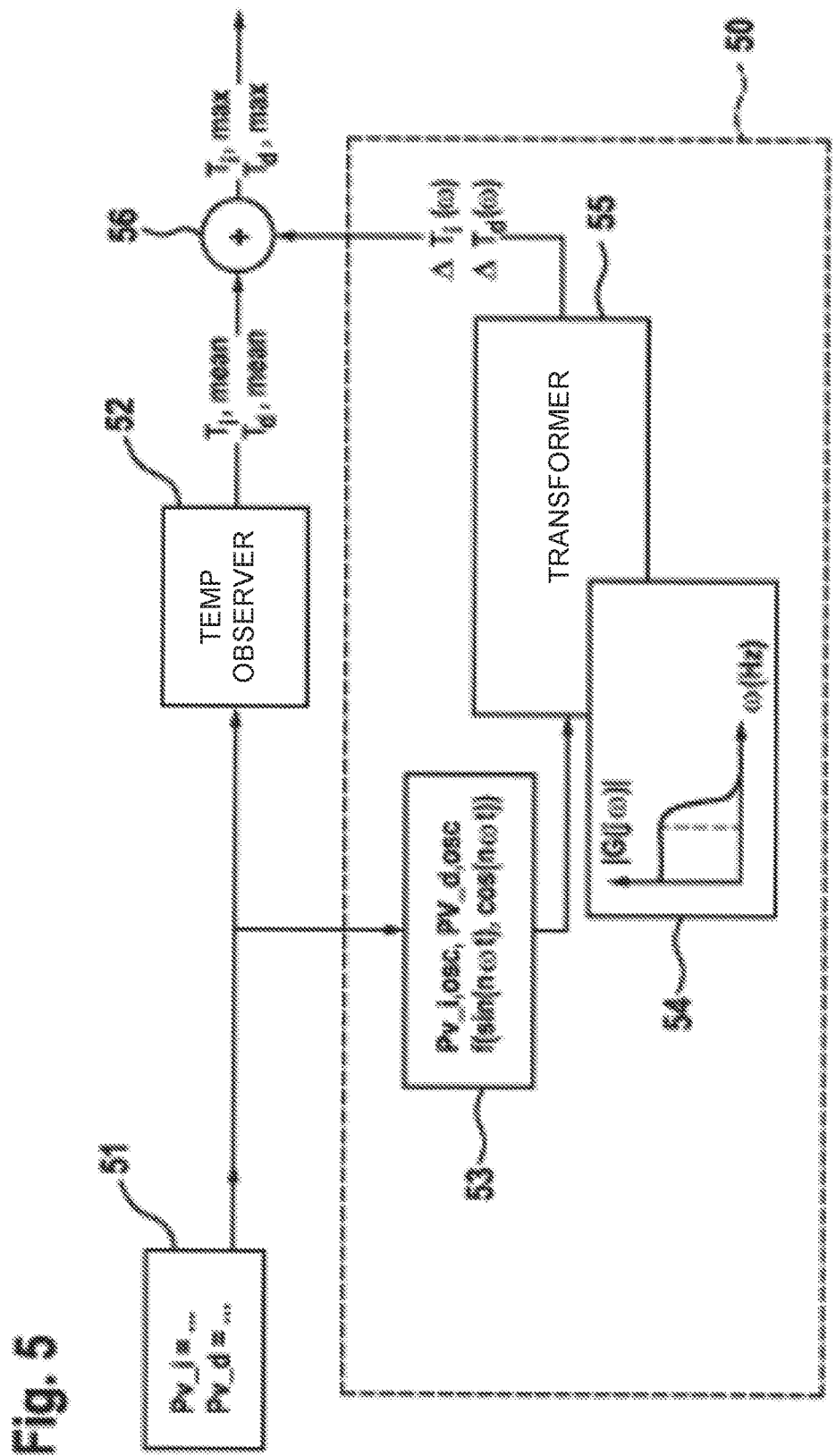
FIG. 5 shows a block diagram of a hybrid observer.

FIG. 5 shows a block diagram of a hybrid observer for calculating a power semiconductor junction temperature, based on a combination of a Luenberger temperature observer and one of the previously described embodiments of the method for estimating the temperature contribution based on a Fourier analysis and a Bode approach.

Specifically, FIG. 5 shows a block diagram of one embodiment of an apparatus for estimating a maximum temperature Ti,max (for the IGBTs) or Td,max (for the diodes) of an inverter. Block 51 is configured as a calculation device for calculating a mean power loss, i.e., the mean value of the power, Pv_i (for the IGBTs) or Pv_d (for the diodes) of the inverter over a full electrical period. Block 52 is configured as a calculation device for calculating, via a Luenberger temperature observer, a mean temperature contribution (Ti,mean, Td,mean) of the inverter, based on the calculated mean power loss (Pv_i, Pv_d).

Block 50 is configured as an apparatus for estimating a temperature contribution of an inverter, and comprises a device for calculating oscillating temperature swings of components of the inverter, and a device for determining an upper envelope of an amplitude of a sum of the calculated oscillating temperature swings, as an estimated temperature contribution of the inverter. Specifically, in a block 53, a zero-mean oscillating component Pv_i,osc (for the IGBTs) or Pv_d,osc (for the diodes) is initially calculated over a full electrical period by means of a Fourier series as a function of sin(nωt) and cos(nωt), with knowledge of the mean value of the power loss Pv_i and Pv_d over a full electrical period for the IGBTs and diodes, said mean value being supplied by block 51 to block 53. The calculated components Pv_i,osc and Pv_d,osc are subjected to a transformation, symbolized by block 54 (frequency response of the transfer behavior) and block 55, which transforms the oscillating power components into respective temperature swings of the IGBTs and diodes, as previously described with reference to FIG. 4. Block 55 is configured for ascertaining the amplitude of the enveloping temperature oscillations as a function of ω, in order to ascertain an upper envelope ΔTi(ω) (for the IGBTs) or ΔTd(ω) (for the diodes) as estimated temperature contributions of the inverter.

The temperature Ti,max or Td,max is then calculated by the adder 56 as the sum of Ti,mean+ΔTi(ω) or Td,mean+ΔTd(ω).

Figure 6:
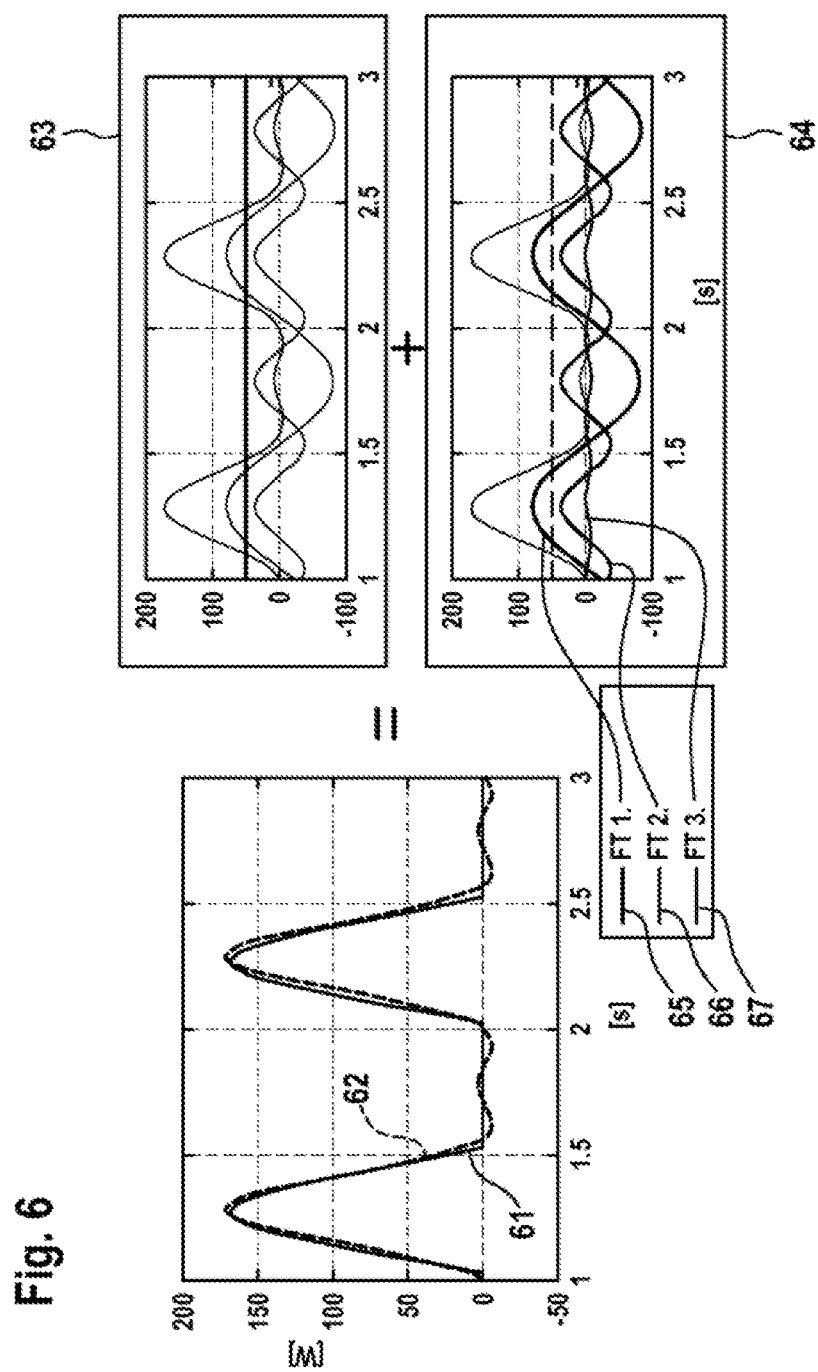
FIG. 6 shows the Fourier analysis of the power loss.

FIG. 6 illustrates the Fourier analysis of the power loss (plotted vertically) over time (plotted horizontally) for determining the zero-mean oscillating power loss. Reference numeral 61 depicts the power loss from the instantaneous currents. Reference numeral 62 depicts the Fourier reconstruction. The right half of FIG. 6 shows the composition of the power loss from the DC component (upper graph 63) and the zero-mean oscillating component (lower graph 64) with the first to third harmonics of the Fourier transform (reference numerals 65, 66, and 67).

Figure 7:
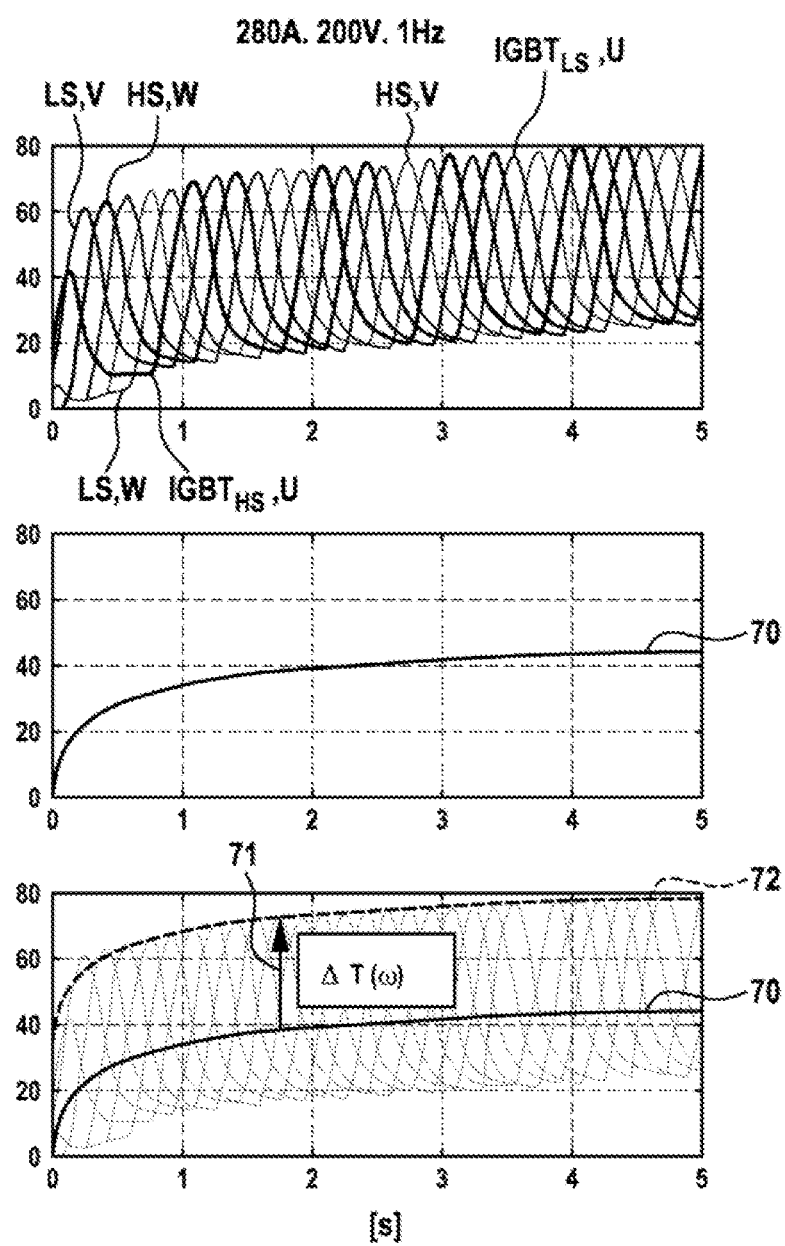
FIG. 7 shows a comparison of the known method for calculating the temperatures.

FIG. 7 illustrates a comparison of the initially mentioned known method for calculating the temperatures using the linear (thermal) networks, with the method of the present invention.

In the upper graph of FIG. 7, the temperature curves (plotted vertically) at phase 240 are depicted for the six IGBTs of the inverter.

The approach of the present invention is illustrated in the center and the lower graphs of FIG. 7, wherein the temperature is also plotted vertically. In contrast to the network method, in which the temperature of each power semiconductor is calculated and the maximum from the six temperatures is subsequently formed, in the method presented here, in addition to the observer (see center graph), which calculates the mean temperature 70, the maximum amplitude 71 of the oscillations, offset by the observer by the mean temperature 70, is determined in order to calculate the overall temperature 72. Thus, a method is taken as a basis which contains the advantages and robustness of an observer.

Figure 8:
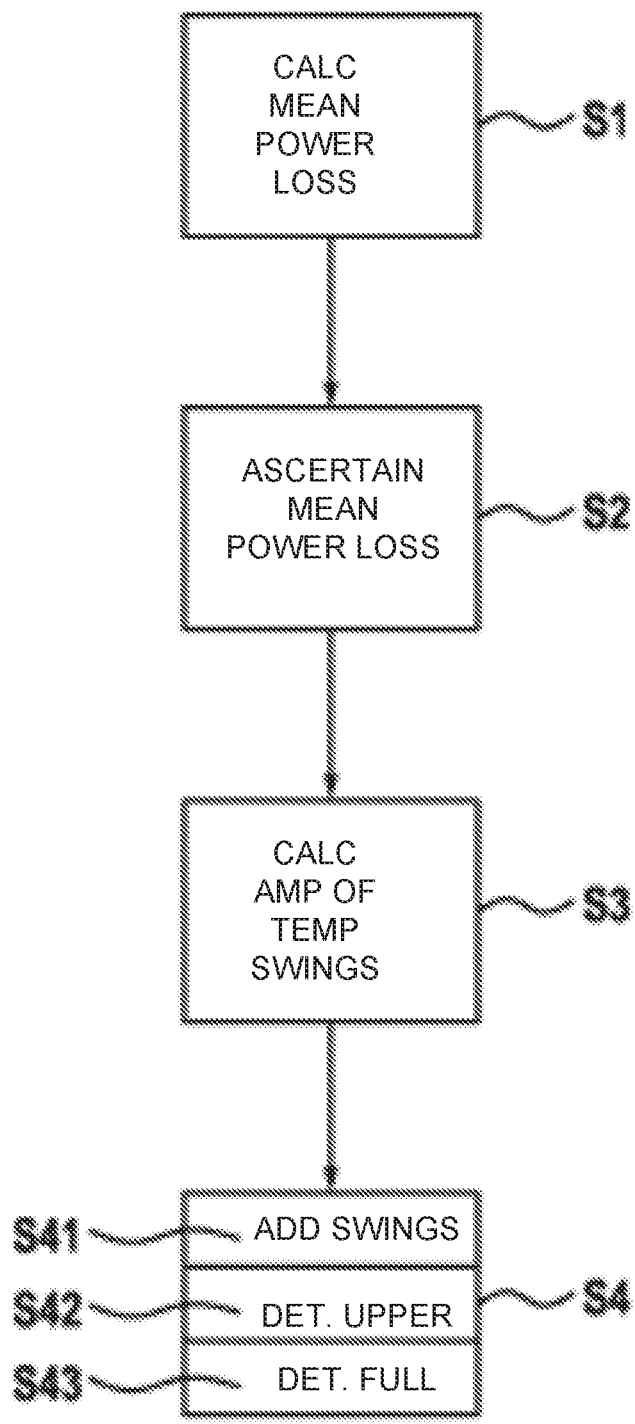
FIG. 8 shows an embodiment of the method in a flow chart.

FIG. 8 illustrates one embodiment of the method in a flow chart. First, in step S1, the mean power loss over a full electrical period is calculated according to the above equation (2). Subsequently, in step S2, the zero-mean oscillating power loss is ascertained from the knowledge about the mean value of the power loss and the signal shape, i.e., sine and sine squared, using a Fourier analysis. Subsequently, in step S3, the amplitude of the individual oscillation temperature swings is calculated from the ascertained zero-mean oscillating power loss or its harmonic components, and the transfer functions which describe the thermal dependencies of the power semiconductors or components of the inverter in one phase, using the knowledge about the amplitude/phase response of a transfer function. Step S4 follows with the consecutive individual steps S41, S42, and S43. In step S41, the calculated temperature swings at the output of each transfer function are added together. In step S42, the components having the same frequency are combined, and a simplified equation is then determined for the amplitude of the upper envelope. In step S43, the maximum of the simplified equation over a full electrical period is determined.

Figure 9:
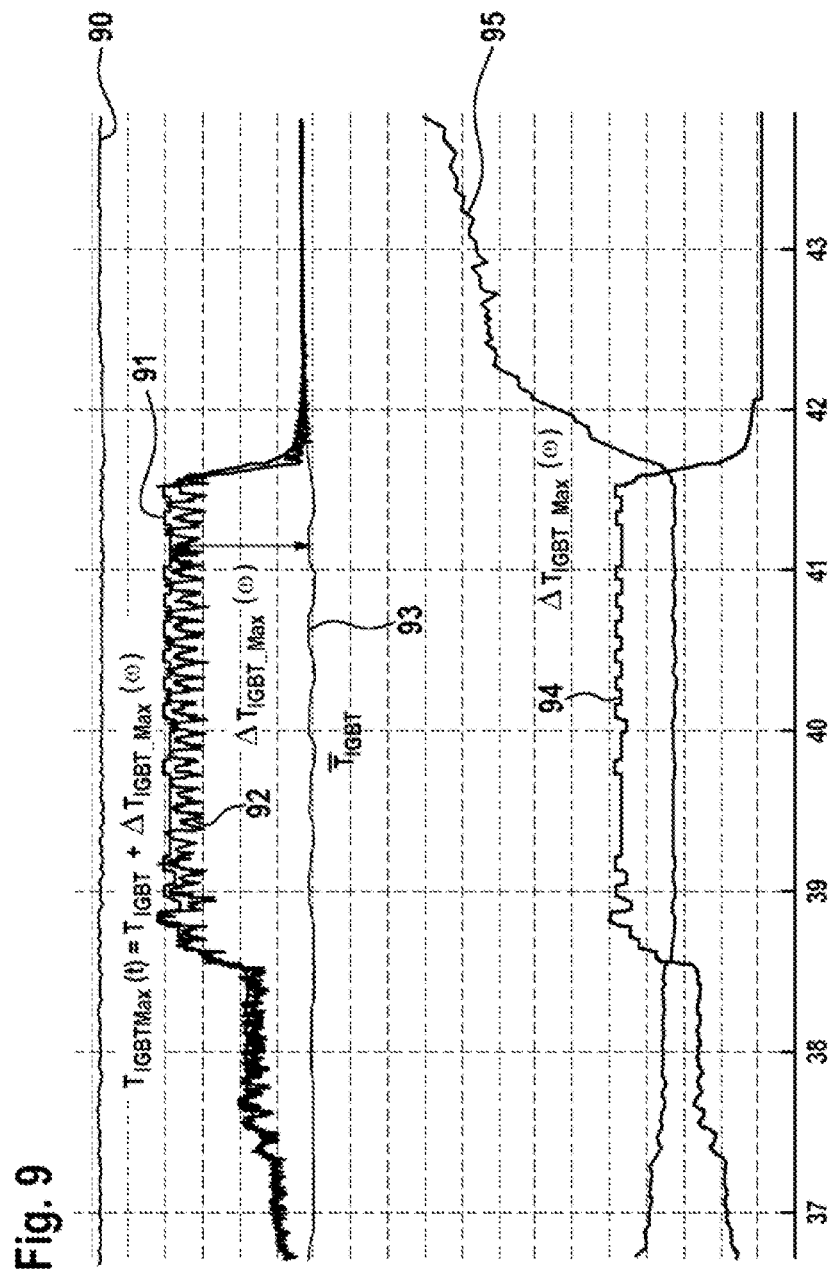
FIG. 9 shows measuring results for the purpose of comparison of the known network method.

In FIG. 9, measuring results are depicted for comparing the known network method and the method according to the present invention on a real inverter.

Curve 90 shows the effective phase current. Curve 95 shows the electrical rotor frequency. Curve 92 shows the result from the known network method. Curve 91 depicts the result of the method newly presented in this application, according to equation (14). Curve 93 depicts the mean IGBT temperature calculated via the temperature observer. Curve 94 depicts the amplitude of the upper envelope of the IGBT temperature ascertained via the new method.

The invention claimed is:

1. A method for estimating a temperature contribution of an inverter used for supplying an electric machine with current the method comprising:
   calculating oscillating temperature swings of components of the inverter; and
   determining an upper envelope (ΔT(ω), ΔTi(ω), (ΔTd(ω)) of an amplitude of a sum of the calculated oscillating temperature swings, as an estimated temperature contribution of the inverters;
   wherein the inverter comprises components of a first switch type configured as IGBTs, and components of a second switch type configured as diodes; and the oscillating temperature swings for the components of the first switch type and the oscillating temperature swings for the components of the second switch type are calculated according to the same parameterized calculation specification, but with different parameter values for the two switch types.

2. The method as claimed in claim 1, characterized in that the upper envelope is determined as a maximum amplitude of the amplitudes of the summed calculated oscillating temperature swings calculated over one electrical period.

3. The method as claimed in claim 1, characterized in that the oscillating temperature swings are calculated based on a calculated zero-mean oscillating power loss (Pv_i,osc, Pv_d, osc).

4. The method as claimed in claim 1, characterized in that the oscillating temperature swings are calculated based on a specified signal shape of an antiderivative of harmonics of the zero-mean oscillating power loss, and are furthermore calculated based on a Fourier analysis.

5. The method as claimed in claim 1, characterized in that the oscillating temperature swings are calculated based on specified transfer functions which describe thermal couplings between components of the inverter associated with the same phase.

6. A method for estimating a temperature or a full temperature contribution of an inverter used for supplying an electric machine with current including the steps for:
   determining a first temperature contribution (ΔT(ω), ΔTi(ω), (ΔTd(ω)) of the inverter by carrying out the method according to claim 1;
   calculating a mean power loss (Pv_i, Pv_d) of the inverter over one electrical period;
   calculating, preferably via a Luenberger temperature observer (52), a mean temperature contribution (Ti, mean, Td,mean) of the inverter based on the calculated mean power loss (Pv_i, Pv_d); and
   calculating a sum of the first temperature contribution (ΔT(ω), ΔTi(ω), (ΔTd(ω)) and the mean temperature contribution (Ti,mean, Td,mean), as the estimated temperature (Ti,max, Td,max) or the full temperature contribution of the inverter.

7. The method as claimed in claim 2, wherein the electrical period is a full electrical period.

8. The method as claimed in claim 3, wherein the calculated zero-mean oscillating power loss is based on a mean power loss (Pv_i, Pv_d) calculated over a full electrical period.

9. The method as claimed in claim 5, wherein the oscillating temperature swings are calculated based on specified transfer functions for all phases of the inverter.

10. The method as claimed in claim 6, wherein the electrical period is a full electrical period.

11. The method as claimed in claim 4, wherein the signal shape is a sinusoidal signal shape.

12. The method as claimed in claim 1, wherein the electrical machine is a synchronous machine.

13. An apparatus (50) for estimating a temperature contribution of an inverter used for supplying an electric machine with current comprising:
 a device for calculating oscillating temperature swings of components of the inverter; and
 a device for determining an upper envelope of an amplitude of a sum of the calculated oscillating temperature swings, as an estimated temperature contribution of the inverter;
 wherein the inverter comprises components of a first switch type configured as IGBTs, and components of a second switch type configured as diodes; and the oscillating temperature swings for the components of the first switch type and the oscillating temperature swings for the components of the second switch type are calculated according to the same parameterized calculation specification, but with different parameter values for the two switch types.

14. An apparatus for estimating a temperature or a full temperature contribution of an inverter used for supplying an electric machine with current comprising:
 a determination device (50) for determining a first temperature contribution via an apparatus as claimed in claim 13;
 a calculation device (51, 52) for calculating a mean power loss (Pv_i, Pv_d) of the inverter via one, preferably full, electrical period, and for calculating, preferably via a Luenberger temperature observer, a mean temperature contribution (Ti,mean, Td,mean) of the inverter based on the calculated mean power loss (Pv_i, Pv_d); and
 an estimation device (56) for calculating a sum of the first temperature contribution and the mean temperature contribution, as the estimated temperature or the full temperature contribution of the inverter.

15. The method as claimed in claim 13, wherein the electrical machine is a synchronous machine.

16. The method as claimed in claim 14, wherein the electrical machine is a synchronous machine.

17. An electric vehicle or hybrid vehicle having an electric drive coupled to the vehicle wheels or the output without a speed converter,
 wherein a temperature contribution of an inverter used for supplying an electric machine with current is estimated by:
 calculating oscillating temperature swings of components of the inverter; and
 determining an upper envelope ($\Delta T(\omega)$, $\Delta Ti(\omega)$, ($\Delta Td(\omega)$)) of an amplitude of a sum of the calculated oscillating temperature swings, as an estimated temperature contribution of the inverter;
 wherein the inverter comprises components of a first switch type configured as IGBTs, and components of a second switch type configured as diodes; and the oscillating temperature swings for the components of the first switch type and the oscillating temperature swings for the components of the second switch type are calculated according to the same parameterized calculation specification, but with different parameter values for the two switch types, and
 wherein the temperature contribution is used therein for self-protection purposes of a power electronic system controlling or driving the electric vehicle, for driving scenarios such as low driving speeds, starting from a standstill, and starting on a hill.

\* \* \* \* \*